(12) United States Patent
Yamada et al.

(10) Patent No.: US 7,272,018 B2
(45) Date of Patent: Sep. 18, 2007

(54) SWITCHING POWER SUPPLY DEVICE AND METHOD FOR CONTROLLING SWITCHING POWER SUPPLY DEVICE

(75) Inventors: Tomoyasu Yamada, Saitama (JP); Masaaki Shimada, Saitama (JP)

(73) Assignee: Sanken Electric Co., Ltd. (JP)

( * ) Notice: Subject to any disclaimer, the term of this patent is extended or adjusted under 35 U.S.C. 154(b) by 0 days.

(21) Appl. No.: 10/538,440

(22) PCT Filed: Dec. 9, 2003

(86) PCT No.: PCT/JP03/15739

§ 371 (c)(1),
(2), (4) Date: Jun. 10, 2005

(87) PCT Pub. No.: WO2004/059822

PCT Pub. Date: Jul. 15, 2004

(65) Prior Publication Data

US 2006/0056210 A1    Mar. 16, 2006

(30) Foreign Application Priority Data

Dec. 24, 2002   (JP) .............................. 2002-373027

(51) Int. Cl.
*H02M 3/335* (2006.01)
(52) U.S. Cl. .......................................... 363/16; 363/97
(58) Field of Classification Search ................. 363/16, 363/78, 89, 97
See application file for complete search history.

(56) References Cited

U.S. PATENT DOCUMENTS

| | | | |
|---|---|---|---|
| 5,297,014 A * | 3/1994 | Saito et al. ............... | 363/21.17 |
| 5,949,226 A | 9/1999 | Tanaka et al. | |
| 6,229,721 B1 * | 5/2001 | Mano et al. ................ | 363/56.1 |
| 6,487,098 B2 * | 11/2002 | Malik et al. ................... | 363/89 |
| 6,507,507 B2 * | 1/2003 | Tokunaga et al. ............. | 363/89 |

FOREIGN PATENT DOCUMENTS

| | | |
|---|---|---|
| EP | 1102387 A2 | 5/2001 |
| JP | 07-274498 A | 10/1995 |
| JP | 08-111975 A | 4/1996 |
| JP | 2000-139075 A | 5/2000 |
| JP | 2002-058239 A | 2/2002 |

\* cited by examiner

*Primary Examiner*—Adolf Berhane
(74) *Attorney, Agent, or Firm*—Townsend and Townsend and Crew

(57) ABSTRACT

By an NMOS (22) being switched on or off, a direct-current voltage $E_0$ is charged in a capacitor (24), and a DC/DC converting circuit (30) charges a direct-current output voltage $V_0$ to be supplied to a load L in a capacitor (34). A load state detection circuit (40) determines whether the load L is in a lightly loaded state or in a non-lightly loaded state, and outputs a signal (S40) as a determination signal. When the load state detection circuit (40) outputs a signal (S41) of "L" as a signal representing that it is a lightly loaded state, a time period setting circuit (41) outputs a signal (S41) of "L" after a preset time period elapses. A PFC on/off switching circuit (42) is supplied with the signal (S41) of "L", and outputs a control signal (S25) of "L" to a power factor improvement circuit (20). Accordingly, in the case where the load L enters a lightly loaded state, the operation of the power factor improvement circuit (20) is stopped when the preset time elapses.

12 Claims, 12 Drawing Sheets

SWITCHING POWER SUPPLY DEVICE AND METHOD FOR CONTROLLING SWITCHING POWER SUPPLY DEVICE

TECHNICAL FIELD

The present invention relates to a switching power supply device mounted with a power factor improvement circuit.

BACKGROUND ART

FIG. 11 is a circuit diagram showing a conventional switching power supply device.

This switching power supply device has a power factor improvement circuit provided at the output side of a full-wave rectifying circuit 2 connected to an alternating-current power supply 1, and a DC/DC converting circuit provided at the output side of the power factor improvement circuit. As the switching power supply device being provided with the power factor improvement circuit, the capacitance of an input electrolysis capacitor of the DC/DC converting circuit can be small-sized.

The power factor improvement circuit comprises a coil 3, an N-channel MOSFET (hereinafter referred to as NMOS) 4, a diode 5, a capacitor 6, and a PFC section control circuit 7.

In the power factor improvement circuit, the NMOS 4 is switched on or off in accordance with a control signal output from the PFC section control circuit 7 thereby repeatedly flowing a switching current through the coil 3. The switching current is in proportion to the instant value of a pulsating voltage generated by the full-wave rectifying circuit 2. The coil 3 stores energy therein by letting the switching current flow therethrough, and the stored energy is changed into a direct-current voltage through the diode 5 and charged into the capacitor 6.

The DC/DC converting circuit comprises a transformer 8, an NMOS 9, a diode 10, a capacitor 11, a DC/DC section control circuit 12, and an output voltage detection circuit 13.

The DC/DC section control circuit 12 is a circuit that controls switching on or off of the NMOS 9, and the output terminal of the DC/DC section control circuit 12 is connected to the gate of the NMOS 9. The output voltage detection circuit 13 is a circuit that detects the voltage charged in the capacitor 111 and supplies it to the DC/DC section control circuit 12.

This switching power supply device is further equipped with a load state detection circuit 14 and a PFC on/off switching circuit 15. The load state detection circuit 14 is connected to the DC/DC section control circuit 12. The PFC on/off switching circuit 15 is disposed between the load state detection circuit 14 and the PFC section control circuit 7 of the power factor improvement circuit. The PFC on/off switching circuit 15 actuates or stops the PFC section control circuit 7.

In this switching power supply device, the NMOS 4 is switched on or off in accordance with a control signal generated by the PFC section control circuit 7. When the NMOS 4 is switched on, a switching current flows through the coil 3 and stores energy therein. In a time period in which the NMOS 4 is switched off, the stored energy is supplied to the capacitor 6 via the diode 5 thereby charging the capacitor 6. The capacitor 6 is charged with a voltage $E_0$ which is higher than the alternating-current voltage generated by the alternating-current power supply 1.

On the other hand, the NMOS 9 is switched on or off in accordance with a control signal supplied from the DC/DC section control circuit 12 to the gate of the NMOS 9. When the NMOS 9 is switched on, a switching current flows from the capacitor 6 to a primary winding 8a of the transformer 8 and stores energy therein. When the NMOS 9 is switched off, the stored energy is charged into the capacitor 11 via the diode 10. The capacitor 11 is charged with a direct-current voltage $V_0$ to be supplied to a load 16.

The output voltage detection circuit 13 detects the level of the direct-current voltage $V_0$, and supplies a voltage signal indicating the level of the direct-current voltage $V_0$ to the DC/DC section control circuit 12. The DC/DC section control circuit 12 generates a control signal for setting the timing at which the NMOS 9 is switched on or off based on the voltage signal supplied from the output voltage detection circuit 13. The NMOS 9 is switched on or off in accordance with this control signal. The load state detection circuit 14 outputs a detection result indicating whether the loaded state of the load 16 is lightly loaded or heavily loaded, based on the duty ratio of this control signal.

When the detection result indicates a heavily loaded state, the PFC on/off switching circuit 15 controls the PFC section control circuit 7 to generate a control signal, so that the switching operation will be continued and the resultant energy will be charged into the capacitor 6.

To the contrary, when the detection result indicates a lightly loaded state, the PFC on/off switching circuit 15 controls the control signal from the PFC section control circuit 7 to be fixed at a low level ("L") so that the switching operation will be stopped. Due to this, the energy generated by the switching current ceases to be charged into the capacitor 6. When the operation of the power factor improvement circuit stops, the power to be consumed drops accordingly. In this state, the DC/DC converting circuit only operates.

As known from the above, a switching power supply device mounted with a conventional power factor improvement circuit includes a device for stopping the operation of the power factor improvement circuit based on the state of the load (see, for example, Unexamined Japanese Patent Application KOKAI Publication No. H8-111975).

As described above, since a conventional switching power supply device has its power factor improvement circuit stop operating when the load 16 is light, it can realize low power consumption. However, since a predetermined startup time is required, after the power factor improvement circuit starts operating, for the output voltage from the power factor improvement circuit to reach a predetermined voltage, trouble is caused if the lightly loaded state and the heavily loaded state are repeated alternately. The trouble will now be explained with reference to FIG. 12.

FIG. 12 is a timing chart for explaining the problem of a conventional switching power supply device.

If the electricity requirements of the load 16 are large and the load 16 is heavy, a load current $I_0$ that flows through the load 16 increases. If the electricity requirements of the load 16 are small and the load 16 is light, the load current $I_0$ flowing through the load 16 decreases and the voltage $V_0$ charged in the capacitor 11 fluctuates. The DC/DC section control circuit 12 generates such a control signal as to make the voltage detected by the output voltage detection circuit 13 constant, thereby setting the timing at which the NMOS 9 is switched on or off.

For example, if the load 16 decreases to under a predetermined value at a time t1, the duty ratio of the control signal is changed. The load state detection circuit 14 detects the state of the load 16 from the duty ratio, and generates, for example, a signal S14 having a low level (hereinafter referred to as "L") in a time period in which the load 16 is light. In the time period in which the signal S14 of "L" is generated, the control signal to be supplied from the PFC section control circuit 7 to the NMOS 4 is controlled at "L" by the PFC on/off switching circuit 15 thereby the power factor improvement circuit is stopped. In other words, the switching of the NMOS 4 is stopped.

As the power factor improvement circuit being stopped, the voltage $E_0$ charged in the capacitor 6 lowers. If the power factor improvement circuit remains stopped, the charging voltage $E_0$ of the capacitor 6 becomes almost the effective value $E_1$ of the pulsating voltage generated by the full-wave rectifying circuit 2.

Even when the load 16 gets heavy again at a time t2 and the power factor improvement circuit starts operating, a predetermined startup time is required before the output voltage of the power factor improvement circuit reaches a predetermined voltage. Since during this time the load of the switching power supply device is heavy, the charging voltage $E_0$ of the capacitor 6 sharply decreases from the time t2. Afterwards, the charging voltage $E_0$ moderately increases from the time t3.

If the load 16 again becomes light at the time t4 before the charging voltage $E_0$ of the capacitor 6 increases to the full, the operation of the power factor improvement circuit stops and the charging voltage $E_0$ of the capacitor 6 starts decreasing from this time.

As described above, if the state where the load 16 is light and the state where it is heavy appear alternately, there occur time periods t12 to t13, t15 to t16, and t17 to t18 during which the charging voltage $E_0$ of the capacitor 6 largely decreases. Assuming a voltage value $E_2$ [V] as the minimum voltage required for the DC/DC converting circuit to maintain its output voltage $V_0$ constant, the charging voltage $E_0$ of the capacitor 6 falls below the charging voltage value $E_2$ [V] in the time periods t12 to t13, t15 to t16, and t17 to t18, and the output voltage of the DC/DC converting circuit therefore lowers (dips).

DISCLOSURE OF INVENTION

It is an object of the present invention to provide a switching power supply device capable of maintaining the output voltage even when the load fluctuates, and a method for controlling a switching power supply device.

To achieve the above object, a power supply device according to a first aspect of the present invention is characterized by comprising:

a charging section (20, 50) which is actuated to charge a charging element (24, 54);

a direct-current voltage generation section (30, 60) which generates a second direct-current voltage based on a first direct-current voltage of the charging element (24, 54), and applies the generated second direct-current voltage to a load (L); and an operation control section (40, 41, 42, 70, 71, 72, 80, 90, 100) which actuates the charging section (20, 50), determines whether a state of the load (L) to which the direct-current voltage generation section (30, 60) applies the second direct-current voltage is a lightly loaded state or not, and in a case where determining that the load (L) enters a lightly loaded state, controls the charging section (20, 50) to stop operation of charging the charging element (24, 54) when a preset time period elapses after it determines that the load (L) enters the lightly loaded state.

A method for controlling a power supply device according to a second aspect of the present invention is a method for controlling a power supply device comprising a charging section (20, 50) which is actuated to charge a charging element (24, 54), and a direct-current voltage generation section (30, 60) which generates a second direct-current voltage based on a first direct-current voltage of the charging element (24, 54) and applies the generated second direct-current voltage to a load (L), characterized by comprising:

a step of determining whether the load (L) is in a lightly loaded state or not; and a step of, in a case where it is determined that the load (L) enters a lightly loaded state, controlling the charging section (20, 50) to stop operation, when the preset time period elapses.

BEST MODE FOR CARRYING OUT THE INVENTION

FIRST EMBODIMENT

Figure 1:
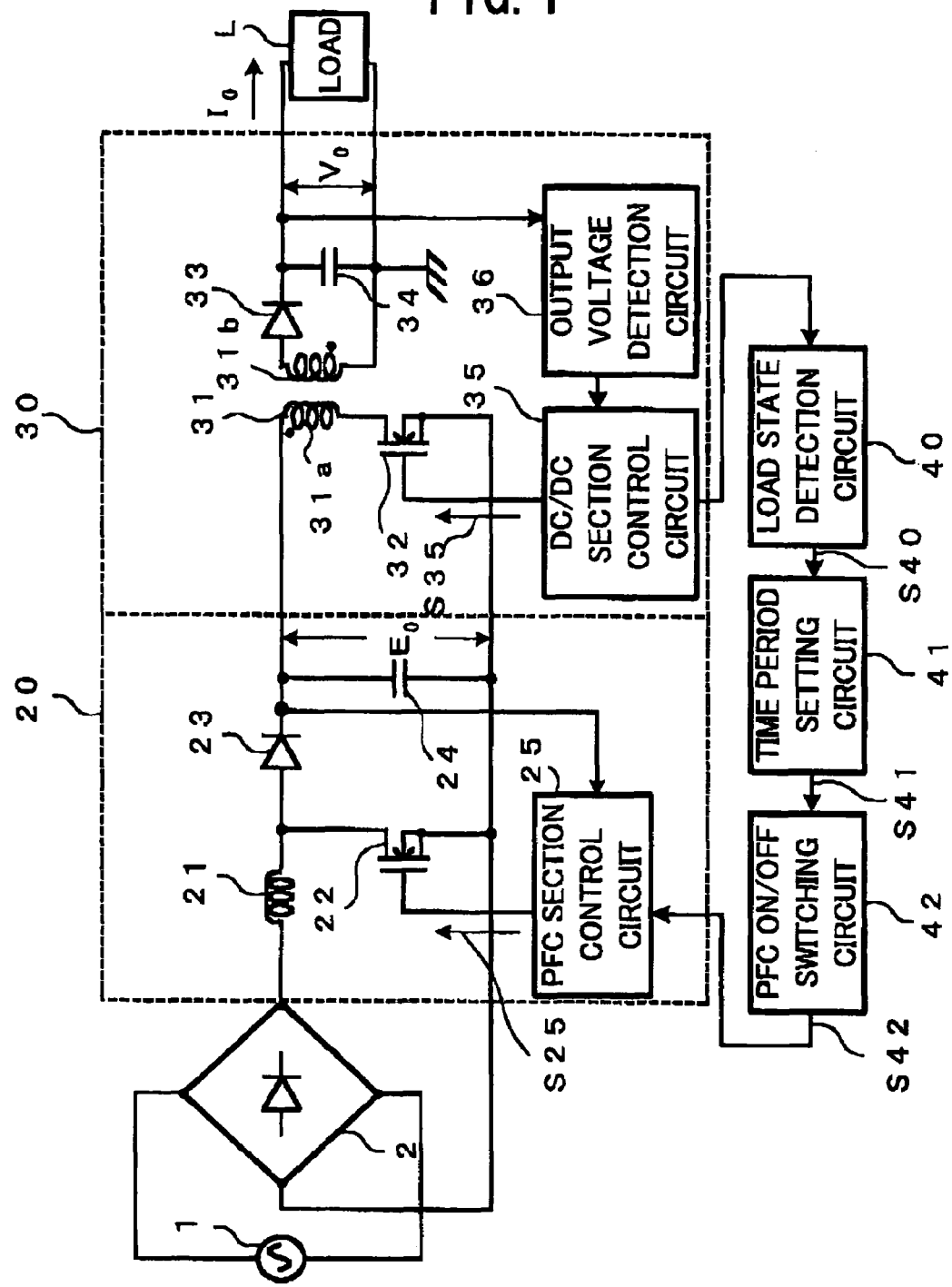
FIG. 1 is a block diagram showing a switching power supply device according to a first embodiment of the present invention.

A switching power supply device according to a first embodiment of the present invention comprises a power factor improvement circuit 20, a DC/DC converting circuit 30, a load state detection circuit 40, a time period setting circuit 41, and a PFC on/off switching circuit 42 as shown in FIG. 1, and supplies a direct-current voltage $V_0$ to a load L.

A full-wave rectifying circuit 2 rectifies an alternating-current voltage generated by an alternating-current power supply 1 and applies a pulsating voltage to the power factor improvement circuit 20.

The power factor improvement circuit 20 is a circuit which is connected to the output end of the full-wave rectifying circuit 2 and improves the power factor by controlling the switching current to follow the pulsating voltage. The power factor improvement circuit 20 is a non-insulated type one, and comprises a coil 21, an NMOS 22, a diode 23, a capacitor 24, and a PFC section control circuit 25.

One end of the coil 21 is connected to the positive electrode of the full-wave rectifying circuit 2, and the other end of the coil 21 is connected to the drain of the NMOS 22 serving as the switching element and to the anode of the diode 23. The source of the NMOS 22 is connected to the negative electrode of the full-wave rectifying circuit 2. The cathode of the diode 23 is connected to one electrode of the capacitor 24 serving as a charging element. The other electrode of the capacitor 24 is connected to the negative electrode of the full-wave rectifying circuit 2.

Figure 4:
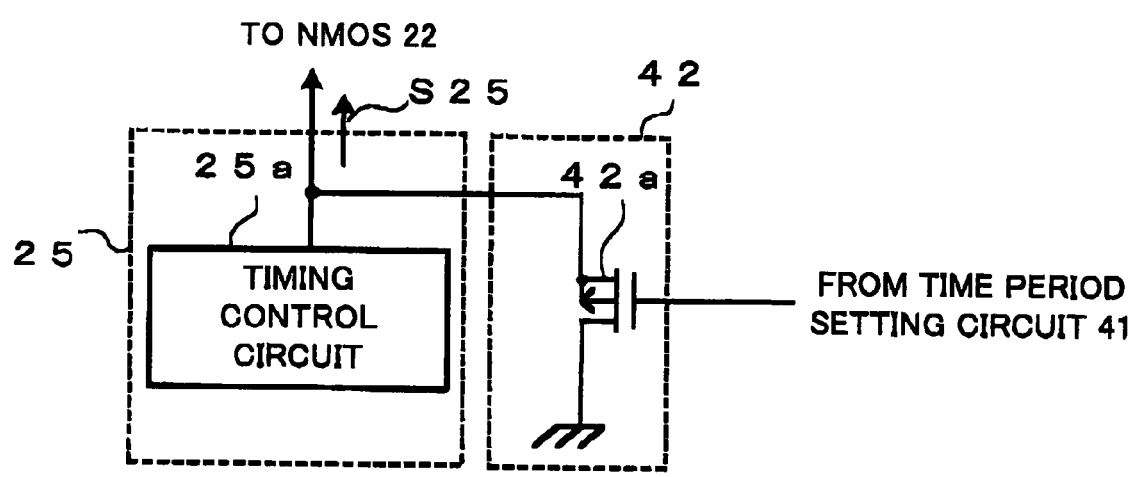
FIG. 4 is a circuit diagram showing a PFC on/off switching circuit shown in FIG. 1.

The PFC section control circuit 25 is a circuit for supplying a control signal S25 to the NMOS 22 to control the whole power factor improvement circuit 20, and comprises a timing control circuit 25a as shown in FIG. 4. The timing control circuit 25a is a circuit for generating the control signal S25 to be supplied to the NMOS 22, and its output terminal is connected to the gate of the NMOS 22 as shown in FIG. 1. The charging voltage $E_0$ of the capacitor 24 is the output voltage of the power factor improvement circuit 20.

The NMOS 22 is switched on when the level of the control signal S25 output from the PFC section control circuit 25 becomes a high level (hereinafter referred to as "H"), and switched off when the signal level becomes a low level (hereinafter referred to as "L"). When the NMOS 22 is switched on or off, the power factor improvement circuit 20 starts operating and charges the capacitor 24.

The capacitor 24 is an input electrolytic capacitor of the DC/DC converting circuit 30, and is a charging element that is electrically charged by the power factor improvement circuit 20. When the operation of the power factor improvement circuit 20 is stopped, the charging voltage $E_0$ of the capacitor 24 is charged at around the peak value of the pulsating voltage applied by the full-wave rectifying circuit 2. The charging voltage $E_0$ of the capacitor 24 becomes almost the effective value of the pulsating voltage.

When a startup time passes after the power factor improvement circuit 20 starts operating, it charges the capacitor 24 with a voltage higher than the alternating-current voltage generated by the alternating-current power supply 1. The charging voltage $E_0$ of the capacitor 24 at this time is assumed as voltage $E_1$.

The DC/DC converting circuit 30 is a circuit for voltage-converting the output voltage $E_0$ of the power factor improvement circuit 20 and applying the converted voltage to the load L. The DC/DC converting circuit 30 stabilizes the voltage to be supplied to the load L by PWM (Pulse Width Modulation) control. The DC/DC converting circuit comprises a transformer 31, an NMOS 32, a diode 33, a capacitor 34, a DC/DC section control circuit 35, and an output voltage detection circuit 36.

The transformer 31 includes a primary winding 31a and a secondary winding 31b which are electromagnetically coupled to each other. One end of the primary winding 31a is connected to the connection node between the cathode of the diode 23 and the one electrode of the capacitor 24 which are in the power factor improvement circuit 20.

The drain of the NMOS 32 is connected to the other end of the primary winding 31a of the transformer 31. The source of the NMOS 32 is connected to the other electrode of the capacitor 24.

The anode of the diode 33 is connected to one end of the secondary winding 31b of the transformer 31. The cathode of the diode 33 is connected to one electrode of the capacitor 34. The other electrode of the capacitor 34 is earthed together with the other end of the secondary winding 31b.

The turn ratio between the primary winding 31a and secondary winding 31b of the transformer 31 is set at such a ratio at which the output voltage to be applied to the load L by the DC/DC converting circuit 30 can be maintained even if the charging voltage $E_0$ of the capacitor 24 becomes the minimum voltage necessary for operation.

The minimum voltage of the charging voltage $E_0$ of the capacitor 24 is determined by the minimum input voltage of the alternating-current voltage of the alternating-current power supply 1, the loaded state of the load L, the capacitance of the capacitor 24, margin, etc. The minimum voltage is assumed as $E_2$.

The NMOS 32 is a switching element constituted by an N-channel MOSFET, and the gate of the NMOS 32 is connected to the output terminal of the DC/DC section control circuit 35.

Figure 2:
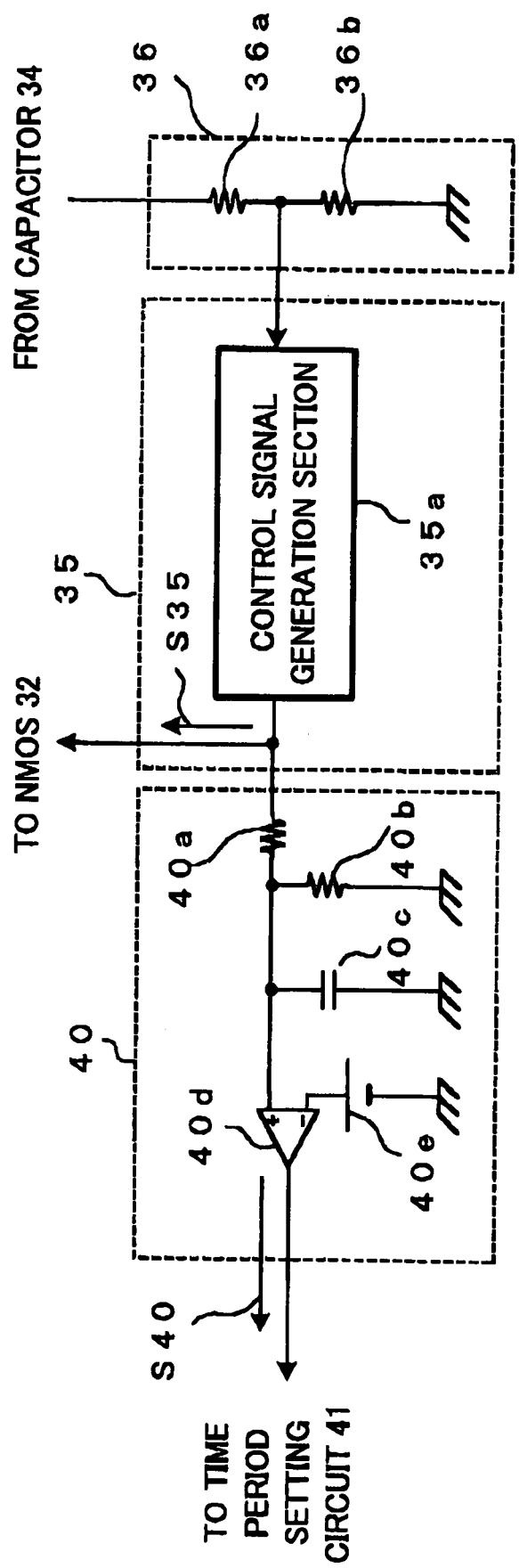
FIG. 2 is a circuit diagram showing a DC/DC section control circuit, an output voltage detection circuit, and a load state detection circuit shown in FIG. 1.

The DC/DC section control circuit 35 is a circuit for controlling the DC/DC converting circuit 30 by PWM, and comprises a control signal generation section 35a as shown in FIG. 2. The control signal generation section 35a sets the duty ratio based on the level of a signal output from the output voltage detection circuit 36 and generates a control signal S35 having this duty ratio set therein. With one cycle regarded as a full time period, the duty ratio indicates the ratio of a time period of "H" to the full time period. The DC/DC section control circuit 35 supplies the control signal S35 generated by the control signal generation section 35a to the NMOS 32. The NMOS 32 is switched on when the control signal S35 output from the DC/DC section control circuit 35 becomes "H, and switched off when the control signal S35 becomes "L".

The diode 33 rectifies the voltage induced in the secondary winding 31b. The capacitor 34 smoothes the rectified voltage output from the diode 33 and generates a direct-current voltage $V_0$. This direct-current voltage $V_0$ is the output voltage of the DC/DC converting circuit 30 and at the same time the output voltage of the switching power supply device. The output voltage detection circuit 36 is connected to the connection node between the one electrode of the capacitor 34 and the cathode of the diode 33.

The output voltage detection circuit 36 is constituted by, for example, resistors 36a and 36b connected in series as shown in FIG. 2. One end of the resistor 36a is connected to the connection node between the one electrode of the capacitor 34 and the cathode of the diode 33, and one end of the resistor 36b is earthed to the ground. The connection node between the resistor 36a and the resistor 36b serves as the output terminal of the output voltage detection circuit 36. The output voltage detection circuit 36 outputs divisional voltages of the direct-current voltage $V_0$ which is divided between the resistor 36a and the resistor 36b to the DC/DC section control circuit 35.

The load state detection circuit 40, the time period setting circuit 41, and the PFC on/off switching circuit 42 serve for determining whether the state of the load L is a lightly loaded state or not, and when determining that the load L enters a lightly loaded state, stopping the power factor improvement circuit 20 from the operation of charging the capacitor 24 when a preset time period elapses since the load L enters the lightly loaded state.

The load state detection circuit 40 is a circuit that detects the loaded state of the load L based on the duty ratio of the control signal S35, and outputs a determination signal representing whether the load L is in a lightly loaded state or not.

As shown in FIG. 2, the load state detection circuit 40 is connected to the output terminal of the DC/DC section control circuit 35, and acquires the control signal S35 generated by the control signal generation section 35a of the DC/DC section control circuit 35.

The load state detection circuit 40 comprises a resistor 40a and a resistor 40b in series, a capacitor 40c, a comparator 40d, and a reference power supply 40e. One end of the resistor 40a is connected to the output terminal of the DC/DC section control circuit 35, and the other end of the resistor 40b is earthed. The connection node between the resistor 40a and the resistor 40b is connected to one electrode of the capacitor 40c and to the input terminal (+) of the comparator 40d. The other electrode of the capacitor 40c is earthed.

The reference power supply 40e is connected to the other input terminal (−) of the comparator 40d. The reference voltage of the reference power supply 40e is a voltage set in advance for determining whether the load L is in a lightly loaded state or in a non-lightly loaded state.

The comparator 40d outputs from its output terminal, a signal S40 showing a result of comparing the voltage supplied to its input terminal (+) and the voltage of the reference power supply 40e supplied to its input terminal (−).

If the load current of the load L is small, the duty ratio of the control signal S35 becomes small and the voltage to be supplied to the input terminal (+) becomes low. If the voltage supplied to the input terminal (+) is lower than the voltage of the reference power supply 40e, the comparator 40d outputs the signal S40 of "L" from the output terminal. The output terminal of the comparator 40d acts as the output terminal of the load state detection circuit 40, and the load state detection circuit 40 outputs the signal S40 of "L" to the time period setting circuit 41 as a determination signal representing that a lightly loaded state is entered.

On the contrary, when the current consumed by the load L increases, the duty ratio of the control signal S35 becomes large. Accordingly, the voltage to be supplied to the input terminal (+) of the comparator 40d increases. When the voltage supplied to the input terminal (+) becomes higher than the voltage of the reference power supply 40e, the comparator 40d outputs a signal S40 of "H" from the output terminal. The load state detection circuit 40 outputs the signal S40 of "H" to the time period setting circuit 41 as a determination signal representing that a non-lightly loaded state is entered.

The time period setting circuit 41 is a circuit that outputs a signal S41 of "L" having a timing set therein to represent that a lightly loaded state is entered, when the signal S40 of "L" is output from the load state detection circuit 40 as a determination signal representing that the load L enters a lightly loaded state.

Figure 3:
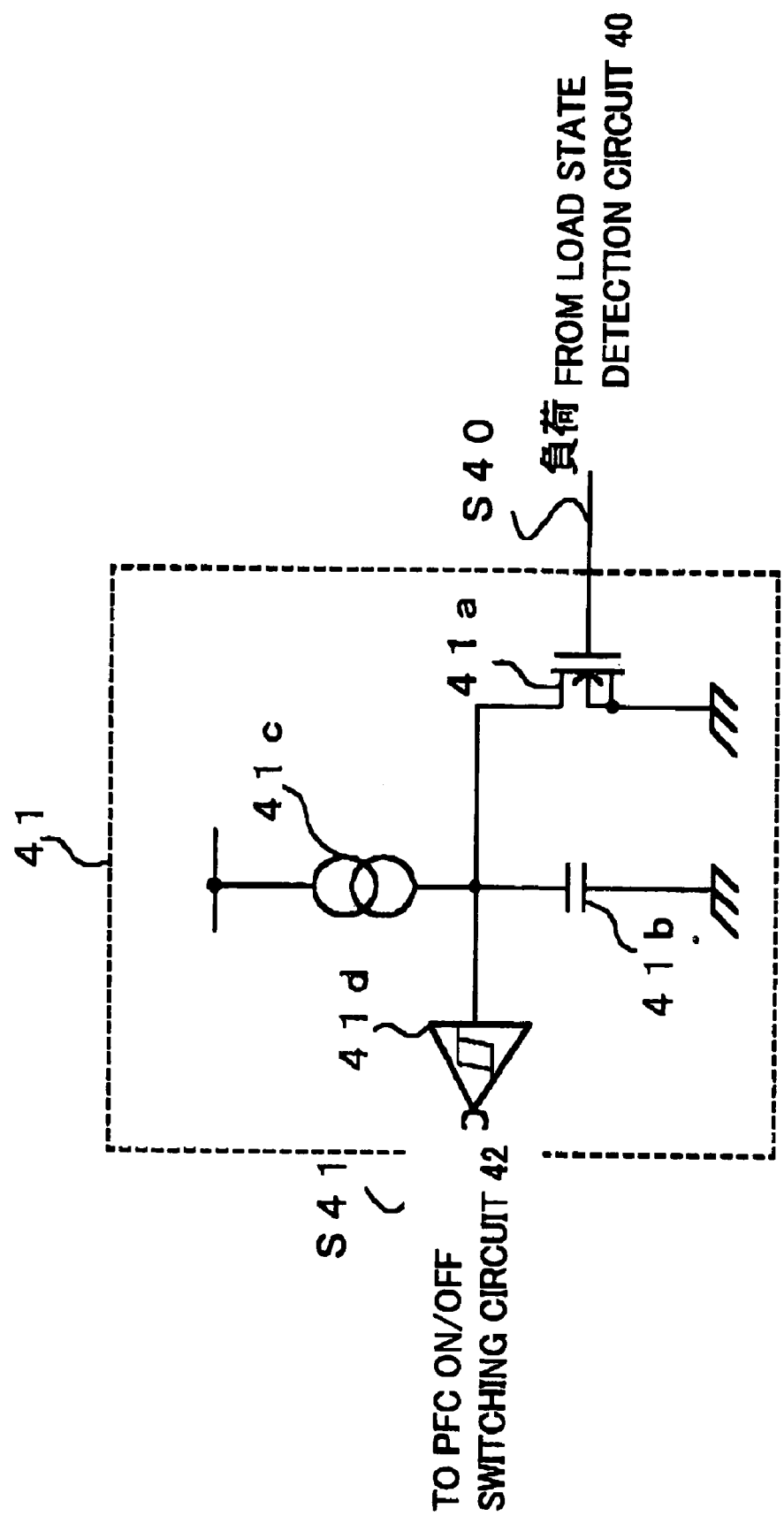
FIG. 3 is a circuit diagram showing a time period setting circuit shown in FIG. 1.

As shown in FIG. 3, the time period setting circuit 41 comprises an NMOS 41a, a capacitor 41b, a constant current source 41c, and a schmitt trigger circuit 41d.

The NMOS 41a is an N-channel MOSFET that is switched on to discharge the capacitor 41b, and the signal S40 is supplied to its gate from the load state detection circuit 40. The source of the NMOS 41a is earthed. The NMOS 41a is switched on when the signal S40 of "H" is supplied to the gate from the load state detection circuit 40 and switched off when the signal S40 of "L" is supplied to the gate.

The capacitor 41b serves to set the level of a signal to be supplied to the schmitt trigger circuit 41d, and the drain of the NMOS 41a is connected to one electrode of the capacitor 41b. The other electrode of the capacitor 41b is earthed.

The constant current source 41c serves to charge the capacitor 41b, and is connected to the connection node between the one electrode of the capacitor 41b and the source of the NMOS 41a.

The input terminal of the schmitt trigger circuit 41d is connected to the one electrode of the capacitor 41b. The schmitt trigger circuit 41d compares the voltage Vc of the one electrode of the capacitor 41b with a preset threshold, and outputs an output signal S41 based on the comparison result. The schmitt trigger circuit 41d holds two thresholds Vth1 and Vth2. The threshold Vth1 is a threshold to be compared with the voltage Vc when the voltage Vc rises from a lower level. The threshold Vth2 is a threshold to be compared with the voltage Vc when the voltage Vc falls from a higher level. When the level of the signal S40 changes from "H" to "L" and the voltage Vc gets across the threshold Vth1 from a lower level, the schmitt trigger circuit 41d having an inverter outputs the signal S41 of "L". When the level of the signal S40 changes from "L" to "H" and the voltage Vc gets across the threshold Vth2 from a higher level, the schmitt trigger circuit 41d outputs the signal S41 of "H".

The threshold Vth1 is set higher than the threshold Vth2 (Vth1>Vth2). With the two thresholds Vth1 and Vth2 set in this manner, the schmitt trigger circuit 41d comes to have a hysteresis between the voltage Vc to be input thereto and the signal level of the signal S41 to be output therefrom, and thus fictions stably without being influenced by noise, etc.

Note that the capacitance of the capacitor 41b and the current supply ability of the constant current source 41c are set such that a time T taken from when the NMOS 41a is switched off to when the voltage of the one electrode of the capacitor 41b gets across the threshold Vth1 should be a preset time.

The time T is set based on the startup time which is required from a time when the power factor improvement circuit 20 starts operating to a time when the charging voltage $E_0$ of the capacitor 24, i.e., the output voltage of the power factor improvement circuit reaches the voltage $E_1$, and based on the effect of saving power consumption, and is preferably 100 μsec to 10 sec for practical use.

The PFC on/off switching circuit 42 is a circuit that controls the timing control circuit 25a to stop outputting the control signal S25 to the NMOS 22 thereby to stop the operation of the power factor improvement circuit 20, when the signal S41 of "L" is output from the time period setting circuit 41.

The PFC on/off switching circuit 42 comprises a PMOS 42a as shown in FIG. 4. The PMOS 42a is a P channel MOSFET, and the signal S41 of the time period setting circuit 41 is input to its gate. The source of the PMOS 42a is connected to the output terminal of the PFC section control circuit 25, and the drain of the PMOS 42a is earthed. The PMOS 42a is switched on when the signal S41 of "L" is supplied to its gate. When the PMOS 42a is switched on, the control signal S25 to be output from the PFC section control circuit 25 becomes "L", thereby the NMOS 22 is switched off and the operation of the power factor improvement circuit 20 is stopped.

Next, the operation of this switching power supply device will be explained.

When supplied with an alternating-current voltage from the alternating-current power supply 1, the full wave rectifying circuit 2 rectifies the supplied alternating-current voltage and applies a pulsating voltage to the power factor improvement circuit 20.

When the PMOS 42a of the PFC on/off switching circuit 42 is switched off, the PFC section control circuit 25 outputs a control signal S25 which turns to "H" and "L" alternately and is generated by the timing control circuit 25a to the power factor improvement circuit 20.

The NMOS 22 of the power factor improvement circuit 20 has its gate supplied with the control signal S25, and is switched on or off in accordance with the level of the control signal S25.

When the control signal S25 becomes "H", the NMOS 22 is switched on, and a switching current flows through the coil 21 and stores energy therein while the NMOS 22 is being switched on. When the control signal S25 becomes "L", the NMOS 22 is switched off, and a current flows through the capacitor 24 via the diode 23 in accordance with the energy having been stored during the on period. The capacitor 24 is charged with this current and smoothes the pulsating voltage applied to the power factor improvement circuit 20. The power factor improvement circuit 20 charges the capacitor 24 with a higher voltage than the alternating-current voltage generated by the alternating-current power supply 1. The charging voltage $E_0$ of the capacitor 24 reaches the voltage $E_1$.

The DC/DC section control circuit 35 starts operating and supplies the control signal S35 of "H" or "L" to the gate of the NMOS 32.

When the control signal S35 is "H", the NMOS 32 is switched on, and a switching current flows through the primary winding 31a of the transformer 31 from the capacitor 24 while the NMOS 22 is being switched on thereby storing energy in the primary winding 31a.

When the control signal S35 is "L", the NMOS 32 is switched off. And when the NMOS 32 is switched off, a current flows through the capacitor 34 via the secondary winding 31b and the diode 33 in accordance with the energy having been stored during the on period. The capacitor 34 is charged with this current and smoothes the rectified voltage from the diode 33. The capacitor 34 is charged with a direct-current voltage $V_0$ to be supplied to the load L.

The output voltage detection circuit 36 generates voltages proportional to the direct-current voltage $V_0$ at the resistors 36a and 36b, and supplies a signal indicating the level of the direct-current voltage $V_0$ to the DC/DC section control circuit 35. The DC/DC section control circuit 35 performs PWM control based on the level of the signal supplied from the output voltage detection circuit 36.

That is, if the direct-current voltage $V_0$ becomes slightly higher than a preset voltage, the DC/DC section control circuit 35 slightly reduces the duty ratio of the control signal S35. When the duty ratio of the control signal S35 becomes slightly smaller, the direct-current voltage $V_0$ becomes lower.

On the other hand, if the direct-current voltage $V_0$ becomes slightly lower than the preset voltage, the DC/DC section control circuit 35 slightly increases the duty ratio of the control signal S35. When the duty ratio of the control signal S35 is slightly increased, the direct-current voltage $V_0$ increases. In this manner, the direct-current voltage $V_0$ is controlled to be the preset voltage, and becomes almost constant.

Along with the increase or decrease of the load current $I_0$ flowing through the load L, the load L becomes a lightly loaded state or a non-lightly loaded state. In accordance with this change in the load state, the direct-current voltage $V_0$ also slightly changes.

The load state detection circuit 40 detects the loaded state of the load L based on the duty ratio of the control signal S35 generated by the DC/DC section control circuit 35.

The resistor 40a and resistor 40b of the load state detection circuit 40 divide the level of the control signal S35 repeating "H" and "L". The capacitor 40c is charged with a divisional voltage signal resulting from the control signal S35, and smoothes this divisional voltage signal. The load state detection circuit 40 supplies the signal of the level having been smoothed to the input terminal (+) of the comparator 40d.

The comparator 40d compares the level of the signal supplied from the capacitor 40c with the reference voltage supplied from the reference power supply 40e.

Figure 5:
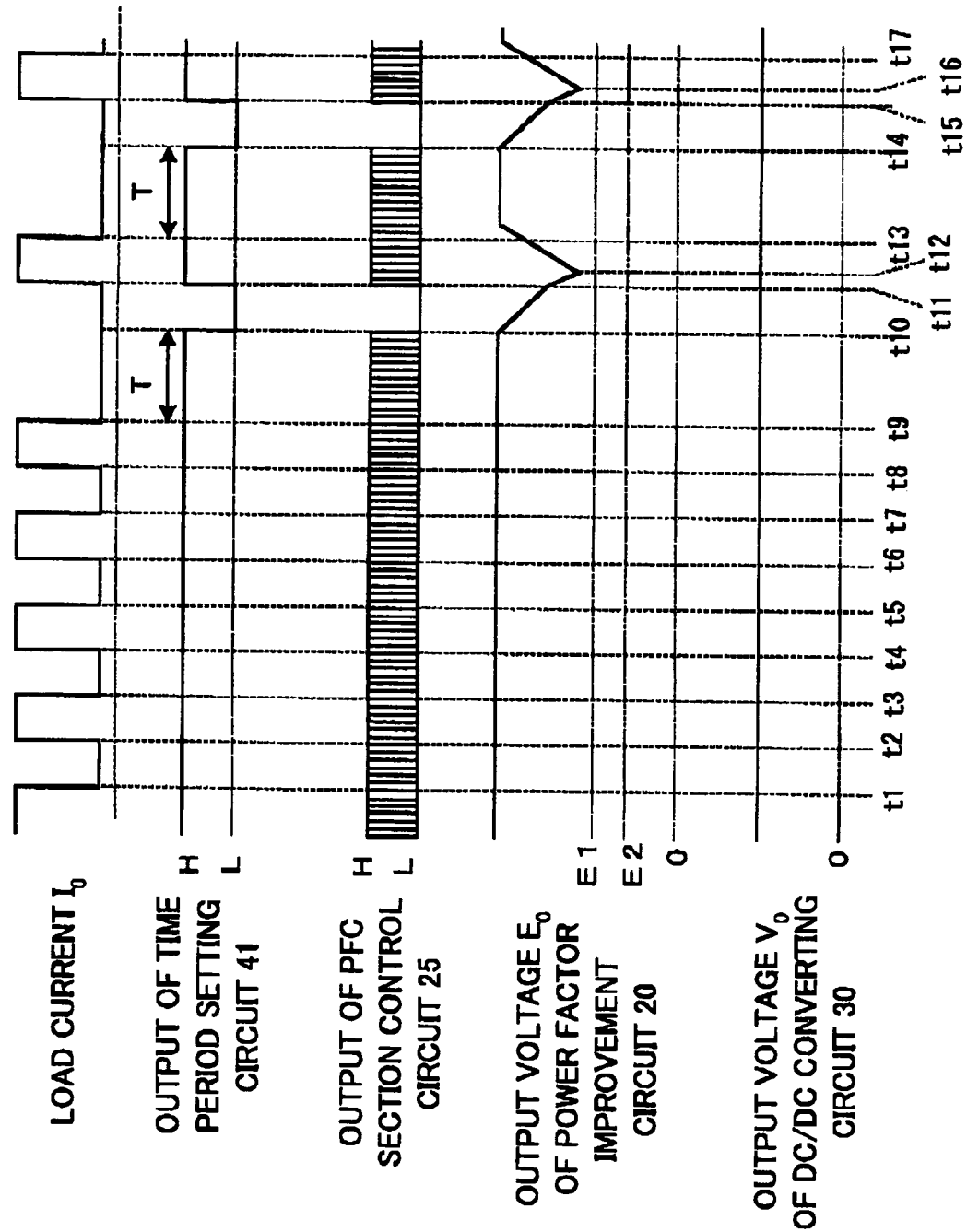
FIG. 5 is a timing chart for explaining the state of an output voltage of a DC/DC converting circuit 30 shown in FIG. 1.

When a predetermined load current $I_0$ flows through the load L from the times t2 to t3 shown in FIG. 5 and the level of the signal from the capacitor 40c supplied to the input terminal (+) of the comparator 40d becomes higher than the reference voltage, the comparator 40d outputs a signal S40 of "H". The load state detection circuit 40 outputs this signal S40 of "H" to the time period setting circuit 41 as a determination signal showing that the load L is in a non-lightly loaded state, If the level of the signal S40 supplied to the gate of the NMOS 41a of the time period setting circuit 41 is "H", the NMOS 41a is switched on. When the NMOS 41a is switched on, one electrode of the capacitor 41b gets earthed, and the charging voltage Vc of the capacitor 41b becomes almost 0. Since the level of the signal to be supplied to the schmitt trigger circuit 41d becomes equal to or lower than the threshold Vth1, the schmitt trigger circuit 41d supplies a signal S41 of "H" to the PFC on/off switching circuit 42.

The PMOS 42a of the PFC on/off switching circuit 42 is switched off when its gate is supplied with the signal S41 of "H". When the PMOS 42a is switched off, the PFC section control circuit 25 outputs a control signal S25 generated by the timing control circuit 25a to the power factor improvement circuit 20. The power factor improvement circuit 20 charges the capacitor 24 with a voltage higher than the alternating-current voltage generated by the alternating-current power supply 1, and the charging voltage $E_0$ of the capacitor 24 becomes the voltage $E_1$.

When the time t3 comes and the load current $I_0$ flowing through the load L decreases, the duty ratio of the control signal S35 becomes small. When the duty ratio of the control signal S35 becomes small and the level of the signal supplied from the capacitor 40c becomes lower than the reference voltage, the level of the signal S40 to be output from the comparator 40d changes from "H" to "L". The load state detection circuit 40 outputs the signal S40 of "L" to the time period setting circuit 41 as a signal representing that the load L enters a lightly loaded state.

When the level of the signal S40 supplied to the gate of the NMOS 41a of the time period setting circuit 41 changes from "H" to "L", the NMOS 41a having been switched on is switched off. When the NMOS 41a is switched off, the capacitor 41b is charged with the current from the constant current source 41c and the charging voltage Vc of the capacitor 41b increases from 0.

Even if the charging voltage Vc of the capacitor 41b increases but if a non-lightly loaded state returns at the time t4 which is before the threshold Vth1 of the schmitt trigger circuit 41d is got across, the load state detection circuit 40 outputs a signal S40 of "H" to the time period setting circuit 41. Then, the NMOS 41a of the time period setting circuit 41 is switched on with its gate supplied with the signal S40 of "H", and the capacitor 41b is earthed again before the charging voltage Vc of the capacitor 41b gets across the threshold th1. Because of this, the schmitt trigger circuit 41d continuously supplies a signal S41 of "H" to the PMOS 42a of the PFC on/off switching circuit 42.

The PMOS 42a remains switched off, and the NMOS 22 of the power factor improvement circuit 20 is switched on or off in accordance with the level of the control signal S25 output from the PFC section control circuit 25. As described above, if the load L enters a lightly loaded state but if the load L is switched to a non-lightly loaded state before the preset time T passes, the power factor improvement circuit 20 continues to operate as it has been.

When the power factor improvement circuit 20 continues to operate and the time t9 comes at which the load current $I_O$ flowing through the load L decreases and the voltage at the input terminal (+) of the comparator 40d becomes lower than the reference voltage, the load state detection circuit 40 likewise outputs a signal S40 of "L" to the time period setting circuit 41 as a signal representing that the load L enters a lightly loaded state.

The NMOS 41a of the time period setting circuit 41 is switched off and the charging voltage Vc of the capacitor 41b increases from 0. If the time T passes from the time t9 and the non-lightly loaded state continues even when the time t10 comes, the charging voltage Vc of the capacitor 41b gets across the threshold Vth1 of the schmitt trigger circuit 41d.

When the level of the signal supplied to the shcmitt trigger circuit 41d gets across the threshold Vth1, the schmitt trigger circuit 41d supplies a signal S41 of "L" to the PFC on/off switching circuit 42.

The PMOS 42a of the PFC on/off switching circuit 42 is switched on with its gate supplied with the signal S41 of "L". When the PMOS 42a is switched on, the PFC section control circuit 25 supplies a control signal S25 of "L" to the power factor improvement circuit 20. The NMOS 22 of the power factor improvement circuit 20 is to be kept switched off with its gate supplied with the control signal S25 of "L". That is, the operation of the power factor improvement circuit 20 stops. When the operation of the power factor improvement circuit 20 stops, the power to be consumed will be reduced accordingly. Then, the charging voltage $E_O$ of the capacitor 24 decreases.

In a case where the load L turns to be a non-lightly loaded state at the time t11, the power factor improvement circuit 29 starts operating. In the case where the load L enters the non-lightly loaded state, the charging voltage $E_O$ of the capacitor 24 further decreases because the load of the switching power supply device increases. However, since the charging voltage $E_O$ of the capacitor 24 at the time t10 at which the power factor improvement circuit 20 stops operating is $E_1$, the charging voltage $E_O$ does not decrease to equal to or lower than the voltage $E_2$. Accordingly, the DC/DC converting circuit 30 can maintain the output voltage $V_O$, and thus applies an almost constant output voltage $V_O$ to the load L.

Then, the power factor improvement circuit 20 charges the capacitor 24 when the startup time passes after the power factor improvement circuit 20 starts operating, in order to increase the charging voltage $E_O$ to the voltage $E_1$.

As explained above, the switching power supply device according to the present embodiment keeps the power factor improvement circuit 20, which requires a predetermined time to start up, functioning until the preset time T passes, even if the load L have entered lightly loaded state.

Accordingly, it is possible to prevent the charging voltage $E_O$ of the capacitor 24 from decreasing to equal to or lower than the lowest voltage $E_2$ required for keeping the DC/DC converting circuit 30 functioning, and to maintain the output voltage $V_O$ of the DC/DC converting circuit 30 at the preset voltage. Therefore, it is also possible to prevent the load L from erroneous operation.

SECOND EMBODIMENT

Figure 6:
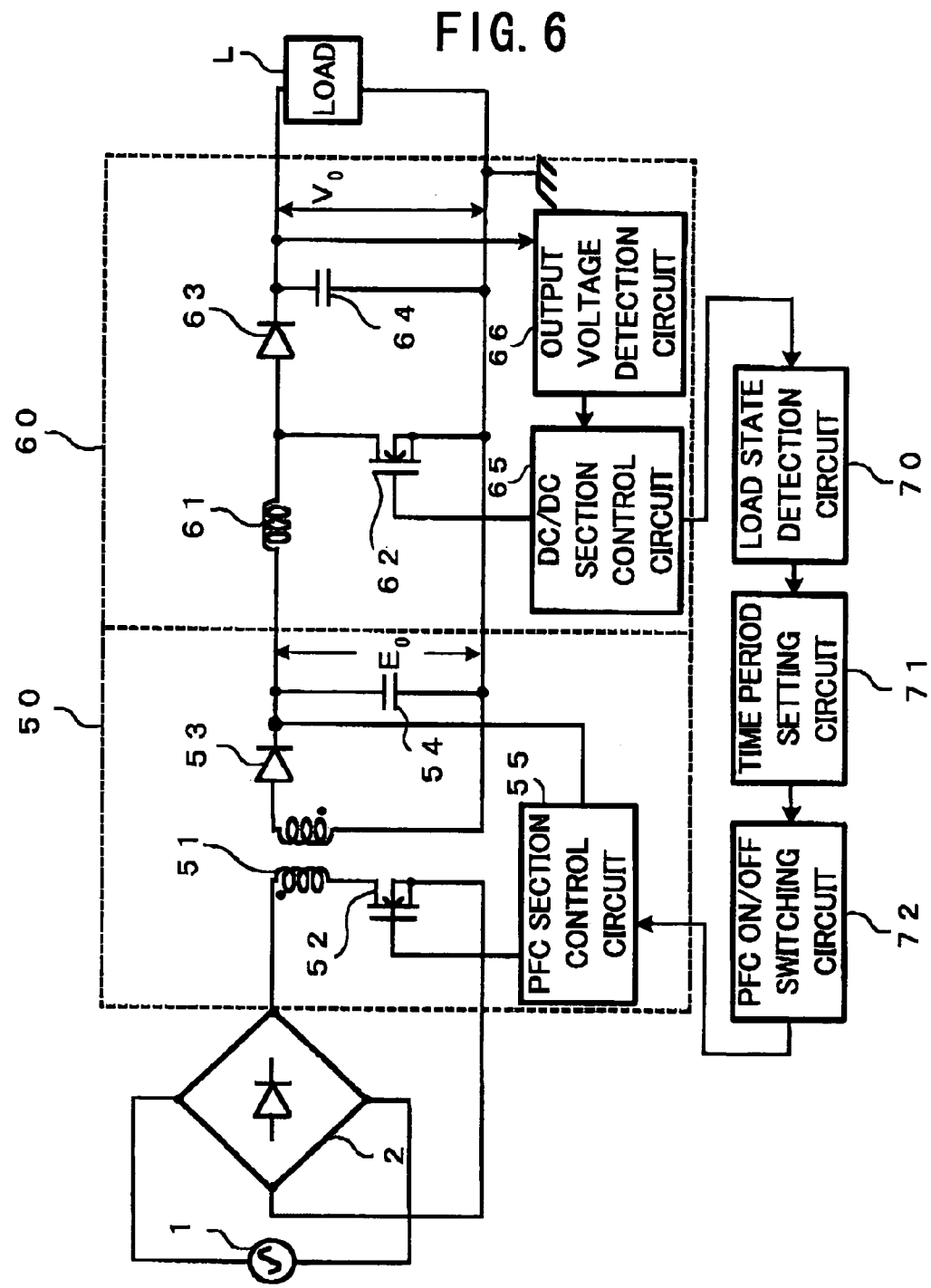
FIG. 6 is a block diagram showing a switching power supply device according to a second embodiment of the present invention.

FIG. 6 is a block diagram showing a switching power supply device according to the second embodiment of the present invention.

The above-described first embodiment has explained a switching power supply device mounted with a non-insulated power factor improvement circuit 20 using a coil 21, however, various power factor improvement circuits can be mounted. Further, The DC/DC converting circuit 30 of the switching power supply device of the first embodiment uses the transformer 31, but a DC/DC converting circuit using no transformer can be mounted. The switching power supply device according to the present embodiment is mounted with an insulated power factor improvement circuit 50 and a boosting DC/DC converting circuit 60, and comprises a load state detection circuit 70, a time period setting circuit 71, and a PFC on/off switching circuit 72.

The power factor improvement circuit 50 comprises a transformer 51, an NMOS 52, a diode 53, a capacitor 54, and a PFC section control circuit 55.

One end of a primary winding of the transformer 51 is connected to the positive electrode of a full-wave rectifying circuit 2 which rectifies an alternating-current voltage generated by an alternating-current power supply 1. The drain of the NMOS 52 is connected to the other end of the primary winding. The source of the NMOS 52 is connected to the negative electrode of the full-wave rectifying circuit 2.

The anode of the diode 53 is connected to one end of a secondary winding of the transformer 51, and one electrode of the capacitor 54 is connected to the cathode of the diode 53, The other electrode of the capacitor 54 is earthed together with the other end of the secondary winding of the transformer 51. The output terminal of the PFC section control circuit 55 is connected to the gate of the NMOS 52. The PFC section control circuit 55 is a circuit same as the PFC section control circuit 25 of the first embodiment.

The DC/DC converting circuit 60 comprises a coil 61, an NMOS 62, a diode 63, a capacitor 64, a DC/DC section control circuit 65, and an output voltage detection circuit 66.

One end of the coil 61 is connected to the connection node between the capacitor 54 and the diode 53 which are in the power factor improvement circuit 50. The other end of the coil 61 is connected to the drain of the NMOS 62 and to the anode of the diode 63. The cathode of the diode 63 is connected to one electrode of the capacitor 64. The other electrode of the capacitor 64 is earthed together with the source of the NMOS 62. A load L is connected between both the electrodes of the capacitor 64.

The DC/DC section control circuit 65 is a circuit same as the DC/DC section control circuit 35 of the first embodiment, and the output terminal of the DC/DC section control circuit 65 is connected to the gate of the NMOS 62. The output voltage detection circuit 66 is a circuit same as the output voltage detection circuit 36, and is connected to the connection node between the one electrode of the capacitor 64 and the cathode of the diode 63. The output terminal of the output voltage detection circuit 66 is connected to the DC/DC section control circuit 65.

The load state detection circuit 70, the time period setting circuit 71, and the PFC on/off switching circuit 72 are circuits same as the load state detection circuit 40, the time period setting circuit 41, and the PFC on/off switching circuit 42 of the first embodiment respectively, and have the same connections.

The power factor improvement circuit 50 switches on or off the NMOS 52 in accordance with a control signal generated by the PFC section control circuit 55. When the NMOS 52 is switched on, a switching current flows through the primary winding of the transformer 51. Energy is stored in the transformer 51 as the switching current flows therethrough, and the stored energy is charged into the capacitor 54 via the secondary winding of the transformer 51 and the diode 53 when the NMOS 52 is switched off.

The NMOS 62 of the DC/DC converting circuit 60 is switched on or off based on the level of a control signal generated by the DC/DC section control circuit 65, and a switching current flows through the coil 61 when the NMOS 62 is switched on. The energy stored in the coil 61 as the switching current flows therethrough is stored in the capacitor 64 via the diode 63 in a period in which the NMOS 62 is switched off. The energy stored in the capacitor 64 appears as a direct-current output voltage $V_O$ to be supplied to the load L.

The load state detection circuit 70, the time period setting circuit 71, and the PFC on/off switching circuit 72 operate in the same way as the load state detection circuit 40, the time period setting circuit 41, and the PFC on/off switching circuit 42 of the first embodiment respectively.

As described above, the switching power supply device of the present embodiment is mounted with the power factor improvement circuit 50 and DC/DC converting circuit 60 which are different from the first embodiment, but the load state detection circuit 70, the time period setting circuit 71, and the PFC on/off switching circuit 72 operate in the same way as the load state detection circuit 40, the time period setting circuit 41, and the PFC on/off switching circuit 42 of the first embodiment respectively. Therefore, fluctuations in the direct-current output voltage $V_O$ to be supplied to the load L are suppressed and erroneous operation, etc. of the load L can be prevented likewise the first embodiment.

The present invention is not limited to the above-described embodiments, but can be modified in various manners. The followings are examples of such modifications.

(1) The present invention is not limited to the power factor improvement circuits 20 and 50, but may be a boosting switching power supply circuit different from the power factor improvement circuits 20 and 50 or something like a voltage-multiplying rectifying circuit.

(2) The present invention is applicable to a switching power supply device mounted with not only the DC/DC converting circuits 30 and 60, but also various types of DC/DC converting circuit.

Figure 7:
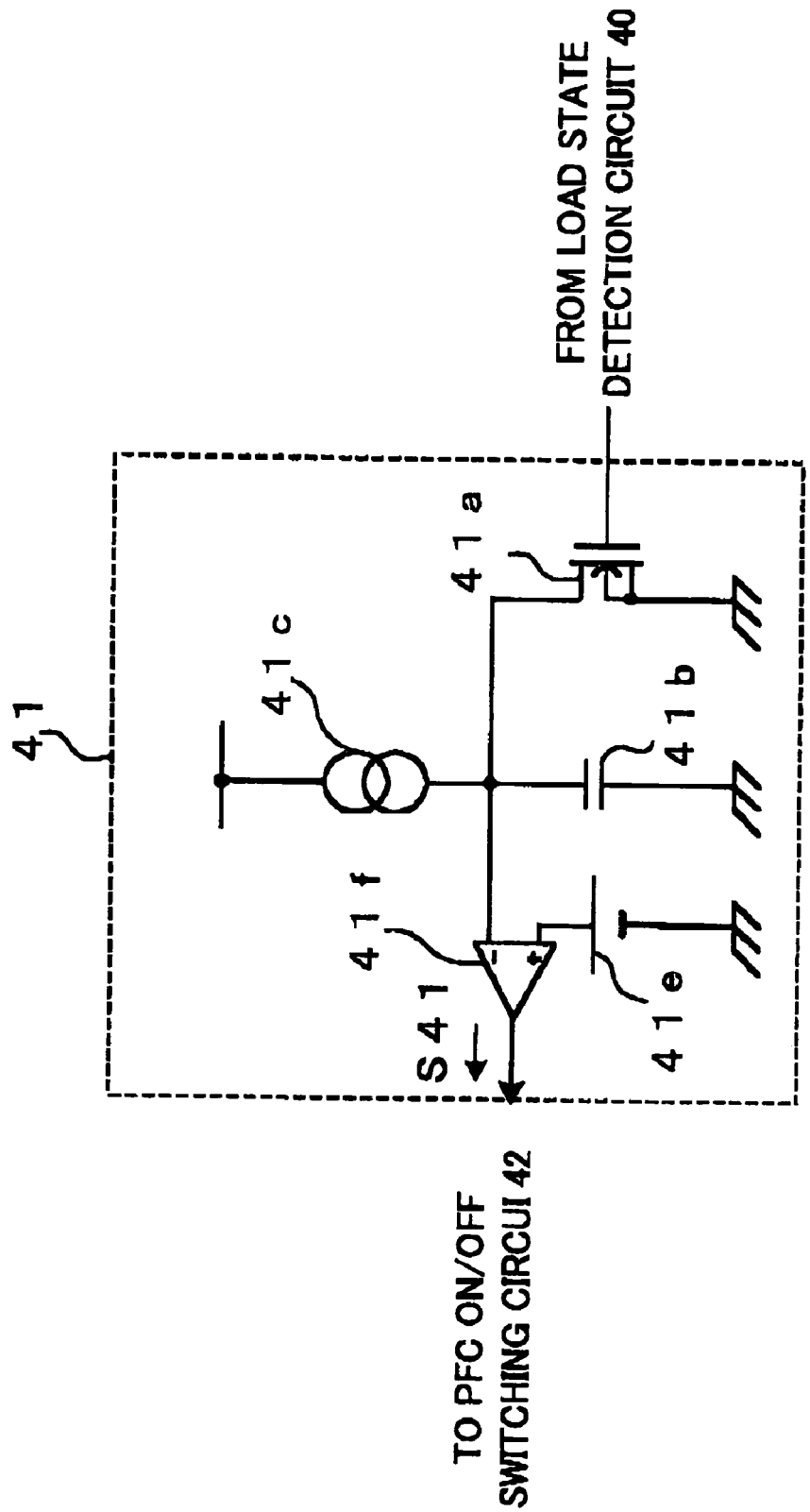
FIG. 7 is a circuit diagram showing a modified example of the time period setting circuit.

(3) The time period setting circuit 41 of FIG. 3 comprises the schmitt trigger circuit 41d, but may comprise a direct-current power supply 41e and a comparator 41f as shown in FIG. 7 instead of the schmitt trigger circuit 41d.

FIG. 7 is a circuit diagram showing an example of modification of the time period setting circuit 41.

In this case, the connection node between one electrode of the capacitor 41b and the drain of the NMOS 41a may be connected to the input terminal (−) of the comparator 41f and the direct-current power supply 41e may be connected to the Input terminal (+) of the comparator 41f. Further, the reference voltage generated by the direct-current power supply 41e may be set variable in accordance with the output from the comparator 41f so as to have a hysteresis likewise the case where the schmitt trigger circuit 41d, which is a schmitt inverter, is provided.

(4) In the first embodiment, the time period setting circuit 41 having the schmitt trigger circuit is used to provide a hysteresis between the output signal S40 of the load state detection circuit 40 and the output signal S41 of the time period setting circuit 41 and thereby to control executing and stopping of charging in the power factor improvement circuit 20 to be switched stably. As compared with this, a circuit for providing a hysteresis such as a schmitt trigger circuit or the like may be set in the load state detection circuit 40, so that executing and stopping of charging in the power factor improvement circuit 20 may be switched stably.

(5) The load state detection circuit 40 determines whether it is a lightly loaded state or a non-lightly loaded state based on the duty ratio of the control signal S35, however, may be so configured as to determine based on the direct-current output voltage $V_O$ or may be so configured as to determine based on a returned signal.

(6) The PFC on/off switching circuit 42 is constituted by the PMOS 42a whereby the control signal S25 is fixed at "L". However, the PFC section control circuit 25 may be so configured as to be made active or inactive by a signal generated by the PFC on/off switching circuit 42.

Figure 8:
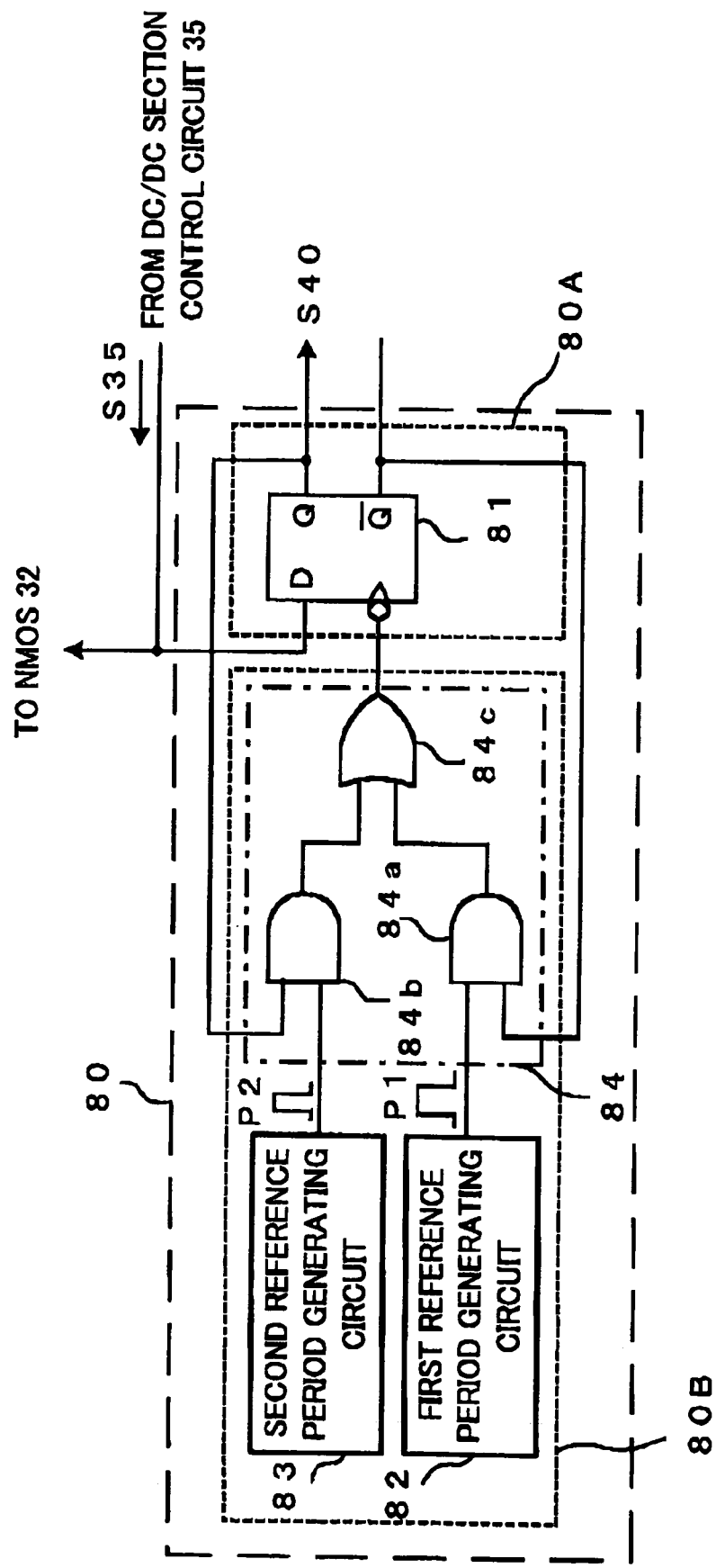
FIG. 8 is a circuit diagram showing a modified example of the load state detection circuit.

(7) The load state detection circuit 40 may be changed to the following load state detection circuit 80 shown in FIG. 8.

FIG. 8 is a circuit diagram showing the load state detection circuit 80 as a modified example of the load state detection circuit 40.

This load state detection circuit 80 comprises an on period comparing circuit BOA and a reference period generating circuit 80B.

The on period comparing circuit 80A is constituted by a delay flip-flop (hereinafter referred to as D-FF) 81. The control signal S35 to be supplied from the DC/DC section control circuit 35 to the gate of the NMOS 32 is input to the data input terminal D of the D-FF 81. The positive phase output terminal Q of the D-FF 81 is the output terminal of the load state detection circuit 80, and the load state detection circuit 80 outputs a signal S40 representing whether the load L is in a lightly loaded state or in a non-lightly loaded state.

The reference period generating circuit 80B comprises a first reference period generating circuit 82, a second reference period generating circuit 83, and a toggle switch circuit 84. The first reference period generating circuit 82 is a circuit which generates a pulse signal P1 synchronous with a periodic wave signal generated by an unillustrated internal oscillator or the like and having a width of a first reference period (T1). The second reference period generating circuit 83 is a circuit which generates a pulse signal P2 synchronous with the periodic wave signal and having a width of a second reference period (T2) shorter than the first reference period.

The toggle switch circuit 84 comprises a two-input AND gate 84a, a two-input AND gate 84b, and a two-input OR gate 84c. One input terminal of the AND gate 84a is connected to the output terminal of the first reference period generating circuit 82, and the other input terminal of the AND gate 84a is connected to the reverse phase output terminal Q bar of the D-FF 81. The output terminal of the AND gate 84a is connected to one input terminal of the OR gate 84c.

One input terminal of the AND gate 84b is connected to the output terminal of the second reference period generating circuit 83. The other input terminal of the AND gate 84b is connected to the positive phase output terminal Q of the D-FF 81. The output terminal of the AND gate 84b is connected to the other input terminal of the OR gate 84c. The output terminal of the OR gate 84c is the output terminal of the toggle switch circuit 84 and is connected to a clock terminal of the D-FF 81.

The operation of the load state detection circuit 80 will be explained.

The first reference period generating circuit 82 generates a pulse signal P1 synchronous with a periodic wave signal generated by the unillustrated oscillator and having a pulse width of T1. The second reference period generating circuit 83 generates a pulse signal P2 having a pulse width of T2 shorter than T1 synchronously with the periodic wave signal.

The positive phase output terminal Q and reverse phase output terminal Q bar of the D-FP 81 respectively output signals having mutually complementary logic levels. When the reverse phase output terminal Q bar of the D-FF 81 is at "H", the AND gate 84a of the toggle switch circuit 84 permits the pulse signal P1 generated by the first reference period generating circuit 82 to pass therethrough. When the positive phase output terminal Q of the D-FF 81 is at "HI", the AND gate 84b permits the pulse signal P2 generated by the second reference period generating circuit 83 to pass therethrough. The OR gate 84c obtains the logical sum of the output signals from the AND gates 84a and 84b and supplies it to the clock terminal of the D-FF 81. That is, the toggle switch circuit 84 selects the second reference period generating circuit 83 when the positive phase output terminal Q of the D-FF 81 is at "H" and supplies the output signal therefrom to the clock terminal of the D-FF 81, and selects the first reference period generating circuit 82 when the reverse phase output terminal Q bar of the D-FF 81 is at "H" and supplies the output signal therefrom to the clock terminal of the D-FF 81.

When the level of the clock terminal falls, the D-FF 81 latches the state of the signal level of the control signal S35 which the DC/DC section control circuit 35 supplies to the gate of the NMOS 32.

For example, when the reverse phase output terminal Q bar of the D-FF 81 is at "H", the toggle switch circuit 84 selects the first reference period generating circuit 82 and supplies the pulse signal P1 to the clock terminal of the D-FF 81. If the control signal S35 is at "H" and thus the NMOS 32 is in the state of being switched on when the pulse signal P1 falls, the D-FF 81 latches "H" and outputs "H" from the positive phase output terminal Q.

If the control signal S35 has become "L" before the pulse signal P1 falls, the D-FF 81 latches "L" and outputs "L" from the positive phase output terminal Q. That is, the D-FF 81 compares the period in which the NMOS 32 is switched on and the period generated by the first reference period generating circuit 82, and shows the result on the signal S40. When the load L is in a lightly loaded state, the signal S40 becomes "L", because the timing at which the NMOS 32 is switched off comes early. When the load is in a non-lightly loaded state, the signal S40 becomes "H" because the timing at which the NMOS 32 is switched off comes late.

When the positive phase output terminal Q of the D-FF 81 is at "H", the toggle switch circuit 84 selects the second reference period generating circuit 83 and supplies the pulse signal P2 to the clock terminal of the D-FF 81. If the control signal S35 is at "H" and the NMOS 32 is switched on when the pulse signal P2 falls, the D-FF 81 latches "H" and the level of the positive phase output terminal Q becomes "H". If the control signal S35 has become "L" before the pulse signal P2 falls, the D-FF 81 latches "L" and outputs the level of the positive phase output terminal Q.

That is, the D-FF 81 compares the period in which the NMOS 32 is switched on with the period generated by the second reference period generating circuit 83, and outputs a signal S40 showing the result. When the load L is in a lightly loaded state, the level of the signal S40 becomes "L" because the timing at which the NMOS 32 is switched off comes early. When the load L is in a non-lightly loaded state, the level of the signal S40 becomes "H" because the timing at which the NMOS 32 is switched off comes late.

As the period (T1) set by the first reference period generating circuit 82 being set longer than the reference period (T2) set by the second reference period circuit 83, the toggle switch circuit 84 has a hysteresis in selection switching.

(8) The PFC on/off switching circuit 42 shown in FIG. 4 controls the switching operation of the NMOS 22 serving as the switching element to be stopped, by switching on the PMOS 4a in order to get the output terminal of the PFC section control circuit 25 earthed. According to this manner, an unillustrated control power supply for driving the PFC section control circuit 25 gets earthed, producing a large loss. In order to prevent such a loss, the following PFC on/off switching circuits 90 and 100 which are shown in FIG. 9 and FIG. 10 may be used.

Figure 9:
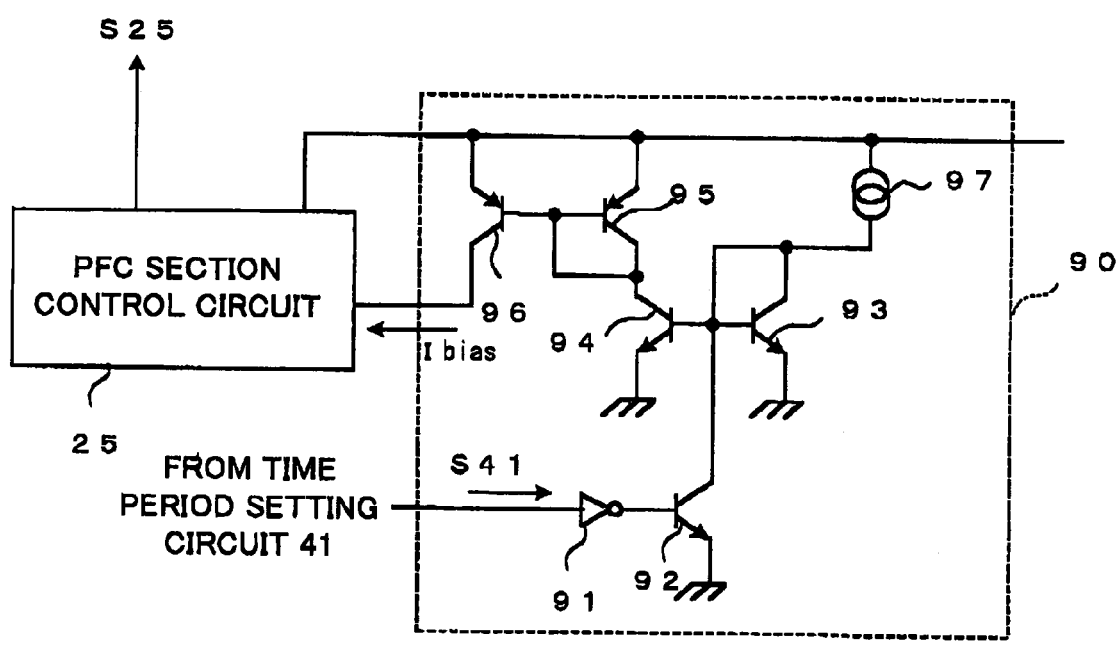
FIG. 9 is a circuit diagram showing a modified example of the PFC on/off switching circuit.
Figure 10:
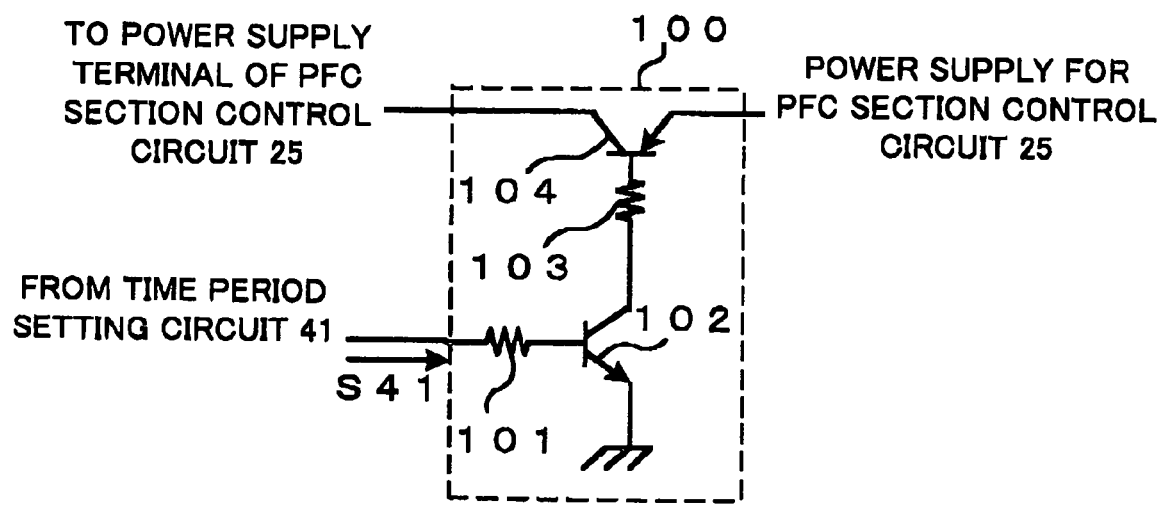
FIG. 10 is a circuit diagram showing another modified example of the PFC on/off switching circuit.
Figure 11:
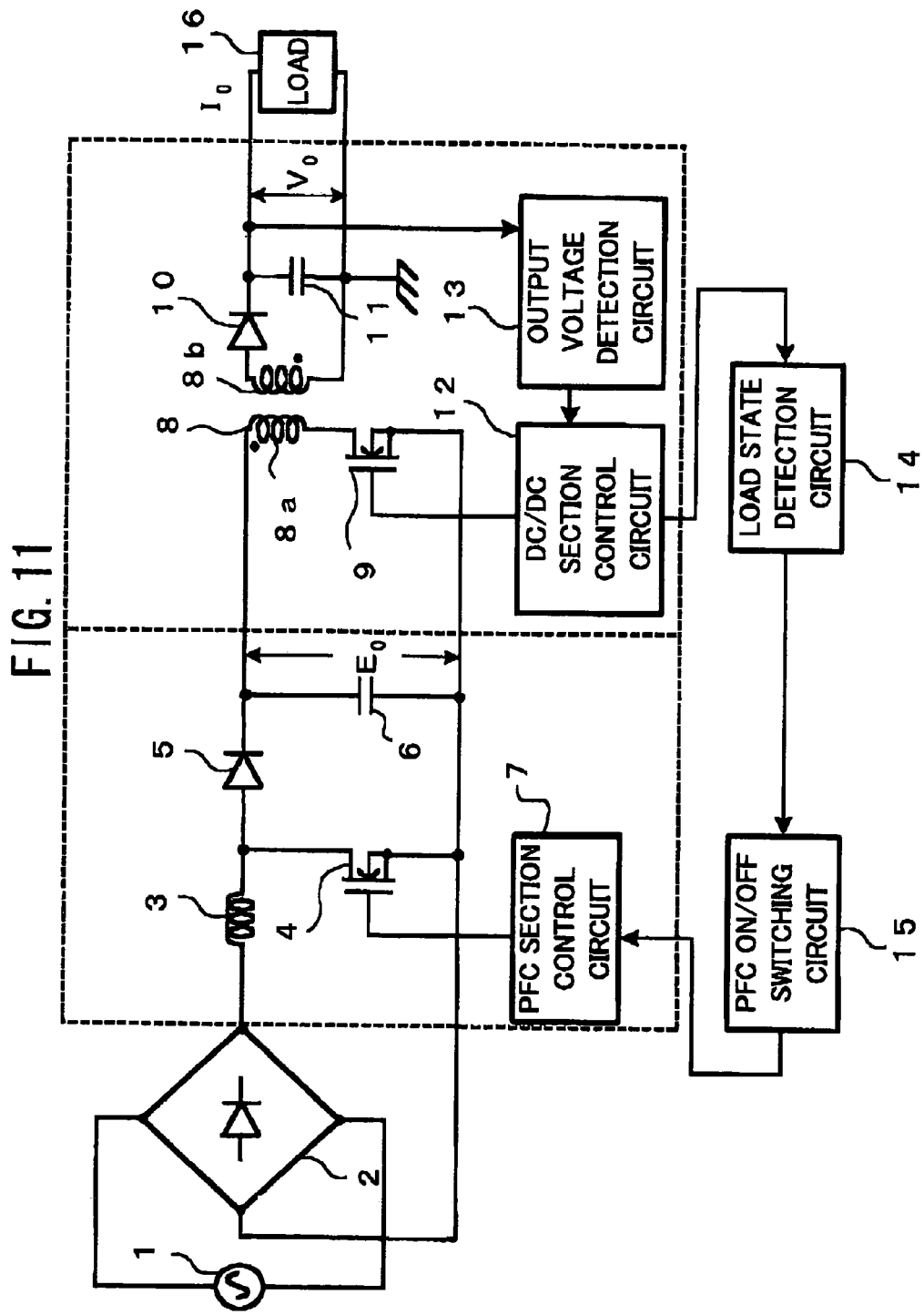
FIG. 11 is a block diagram showing a conventional switching power supply device.
Figure 12:
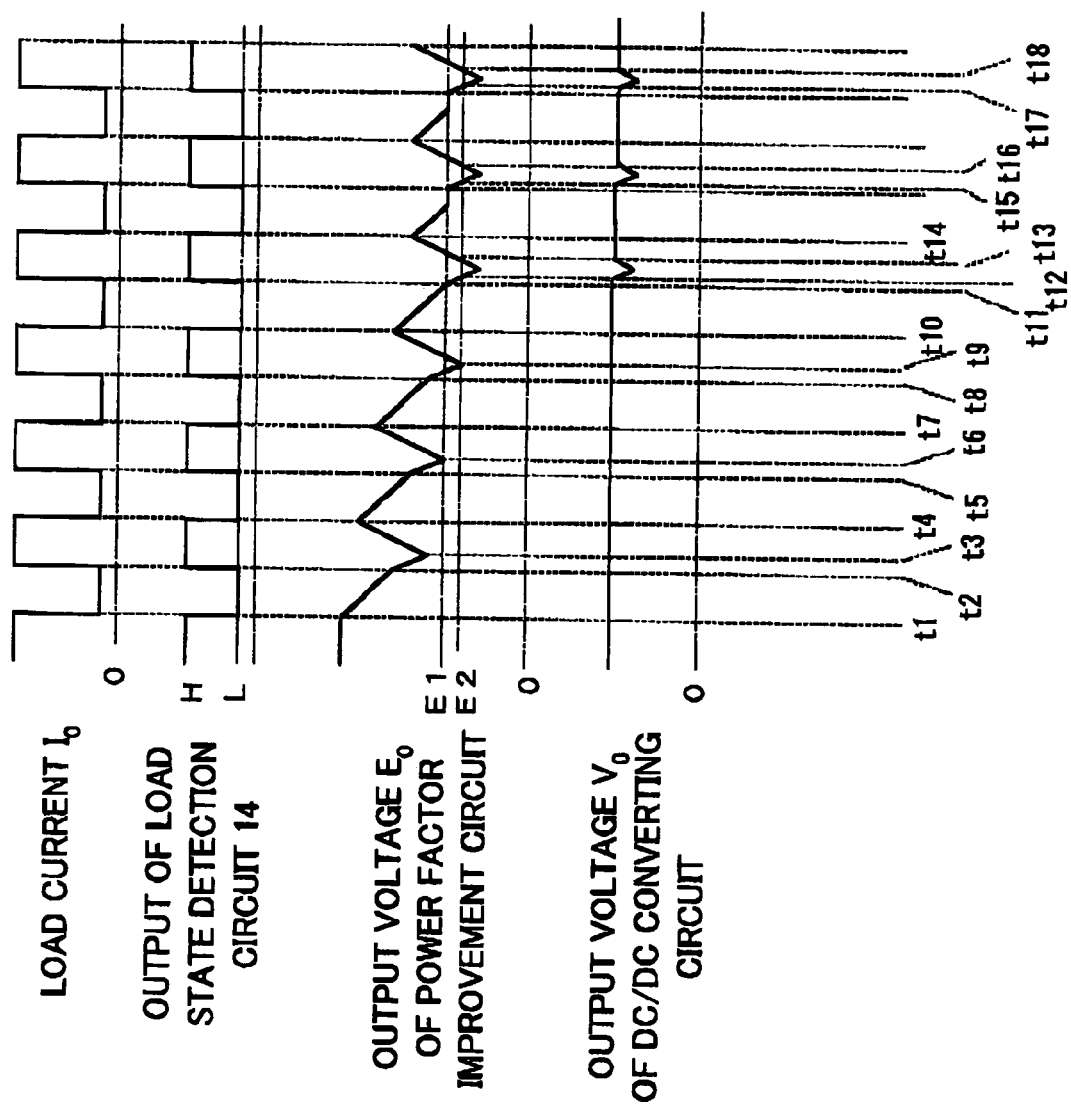
FIG. 12 is a timing chart for explaining the problem of the conventional switching power supply device.

FIG. 9 is a circuit diagram showing a PFC on/off switching circuit 90 as a modified example of the PFC on/off switching circuit 42.

The PFC on/off switching circuit 90 comprises an inverter 91, three NPN transistors 92, 93, and 94, two PNP transistors 95 and 96, and a constant current source 97. The signal S41 is input to the input terminal of the inverter 91 from the time period setting circuit 41. The output terminal of the inverter 91 is connected to the base of the transistor 92. The emitter of the transistor 92 is earthed.

The collector of the transistor 92, the collector and base of the transistor 93, and the base of the transistor 94 are connected to the constant current source 97. The emitters of the transistors 93 and 94 are both earthed. The transistors 93 and 94 constitute a current mirror circuit.

The collector of the transistor 94 is connected to the collector and base of the transistor 95 and to the base of the transistor 96. The emitters of the transistors 95 and 96 are connected to a power supply in common. The transistors 95 and 96 constitute a current mirror circuit. The collector of the transistor 96 is connected to the input terminal of the PFC section control circuit 25 to which a drive current $I_{bais}$ is input.

In the PFC on/off switching circuit 90 shown in FIG. 9, when the level of the signal S41 supplied from the time period setting circuit 41 is high, the inverter 91 outputs "L." and the transistor 92 is switched off. In response to this, the base voltages of the transistor 93 and transistor 94 increase to switch on the transistor 93 and transistor 94. In other words, the current mirror circuit constituted by the transistors 93 and 94 is switched on. As the transistor 94 being switched on, the base voltages of the transistor 95 and transistor 96 decrease thereby to switch on the current mirror circuit constituted by the transistor 95 and transistor 96. Due to this, a drive current $I_{bias}$ flows to the PFC section control circuit 25 via the transistor 96. Supplied with the drive current $I_{bias}$, the PFC section control circuit 25 starts operating and generates the control signal S25 for switching on or off the NMOS 22.

When the level of the signal S41 supplied from the time period setting circuit 41 is low, the inverter 91 outputs "H" and the transistor 92 is switched on. By the transistor 92 being switched on, the base voltages of the transistor 93 and transistor 94 decrease to thereby switch off the current mirror circuit constituted by the transistors 93 and 94. By the transistor 94 being switched off, the base voltages of the transistors 95 and 96 constituting a current mirror circuit increase to switch off the transistor 96. By the transistor 96 being switched off, the drive current $I_{bias}$ ceases to flow to the PFC section control circuit 25, stopping the operation of the PFC section control circuit 25. That is, the control signal S25 for controlling switching on or off of the NMOS 22 is fixed at "L", and the NMOS 22 is stopped from being switched on or off.

Since the PFC on/off switching circuit 90 shown in FIG. 9 controls the NMOS 22 to be stopped from being switched on or off by prohibiting the drive current $I_{bias}$ for the interior of the PFC section control circuit 25 from flowing to the PFC section control circuit 25, the power to be consumed in the PFC section control circuit 25 can be greatly suppressed.

FIG. 10 is a circuit diagram showing a PFC on/off switching circuit 100 as another modified example of the PFC on/off switching circuit 42.

This PFC on/off switching circuit 100 comprises a resistor 101, an NPN transistor 102, a resistor 103, and a PNP transistor 104. The signal S41 is input to one end of the resistor 101 from the time period setting circuit 41. The other end of the resistor 101 is connected to the base of the transistor 102. The emitter of the transistor 102 is earthed, and the collector of the transistor 102 is connected to one end of the resistor 103. The other end of the resistor 103 is connected to the base of the transistor 104.

The emitter of the transistor 104 is connected to a power supply, and the collector of the transistor 104 is connected to the power supply terminal of the PFC section control circuit 25. The transistor 104 serves as a switch for shutting the power to be supplied to the PFC section control circuit 25.

When the level of the signal S41 output from the time period setting circuit 41 is high, the transistor 102 is in the on state and the base voltage of the transistor 104 is therefore decreased. Accordingly, the transistor 104 gets in the on state, and power is supplied to the PFC section control circuit 25 to allow the PFC section control circuit 25 to operate. Due to this, the NMOS 22 is switched on or off. When the level of the output signal S41 from the time period setting circuit 41 drops, the transistor 102 is switched off and the transistor 104 is switched off. In this state, no power is supplied to the PFC section control circuit 25, and therefore the PFC section control circuit 25 does not operate and the NMOS 22 is not switched on or off.

In the PFC on/off switching circuit 100 shown in FIG. 10, the transistor 104 shuts the power supply for the PFC section control circuit 25. Therefore, power loss in the PFC section control circuit 25 can be suppressed to the lowest level possible.

The present invention is based on Japanese Patent Application No. 2002-373027 filed on Dec. 24, 2002, specification, claims and drawings of which are incorporated herein by reference in its entirety.

INDUSTRIAL APPLICABILITY

The present invention can be applied to industrial fields in which a power supply device is used.

The invention claimed is:

1. A power supply device characterized by comprising:
a charging section (20, 50) which is activated to charge a charging element (24, 54);
a direct-current voltage generation section (30, 60) which generates a second direct-current voltage based on a first direct-current voltage of said charging element (24, 54), and applies the generated second direct-current voltage to a load (L); and
an operation control section (40, 41, 42, 70, 71, 72, 80, 90, 100) which actuates said charging section (20, 50), determines whether a state of said load (L) to which said direct-current voltage generation section (30, 60) applies the second direct-current voltage is a lightly loaded state or not, and in a case where determining that said load (L) enters a lightly loaded state, starts detection of elapsed time, and controls said charging section (20, 50) to stop operation of charging said charging element (24, 54) when detecting a preset time period elapses after it determines that said load (L) enters the lightly loaded state.

2. The power supply device according to claim 1, characterized in that the preset time period is set in advance based on a startup time which is required from when said charging section (20, 50) is activated to when the first direct-current voltage reaches a voltage which appears when said charging section (20, 50) operates in a non-lightly loaded state.

3. A power supply device comprising:
a charging section which is activated to charge a charging element;
a direct-current voltage generation section which generates a second direct-current voltage based on a first direct-current voltage of said charging element, and applies the generated second direct-current voltage to a load; and
an operation control section which actuates said charging section, determines whether a state of said load to which said direct-current voltage generation section applies the second direct-current voltage is a lightly loaded state or not, and in a case where determining that said load enters a lightly loaded state, controls said charging section to stop operation of charging said charging element when a preset time period elapses after it determines that said load enters the lightly loaded state,
wherein
said operation control section comprises:
a load state detection section (40, 70, 80) which detects a loaded state of said load (L) and outputs a determination signal representing whether said load (L) is in a lightly loaded state or not;
an output timing setting section (41, 71) which, when said load state detection section (40, 70, 80) outputs a determination signal representing that said load (L) enters a lightly loaded state, sets a timing counted from when the determination signal is output and outputs the timing; and
an operation stopping section (42, 72, 90 100) which controls said charging section (20, 50) to stop the operation of charging said charging element (24, 54) when said output timing setting section (41, 71) outputs a determination signal representing that said load (L) enters a lightly loaded state.

4. The power supply device according to claim 3, characterized in that:
said direct-current voltage generation section (30, 60) is constituted by a switching power supply circuit having a switching element (32); and
said load state detection section (40, 70, 80) acquires a control signal for switching on or off said switching element (32) and determines whether said load (L) enters a lightly loaded state or not based on a duty ratio of the acquired control signal.

5. The power supply device according to claim 3, characterized in that said output timing setting section (41, 71) has two thresholds to be compared with level of a determination signal output from said load state detection section (40, 70, 80), and has a hysteresis by a first threshold, compared with level of a determination signal representing that said load (L) enters a lightly loaded state, being set higher than a second threshold, compared with level of a determination signal representing that said load (L) enters a non-lightly loaded state.

6. The power supply device according to claim 1, characterized in that said charging section (20, 50) is a power factor improvement circuit comprising:

said charging element (24, 54);
a coil (21, 51);
a switching element (22, 52) which repeats a switching operation of being switched on or off under control of said operation control section (40, 41, 42, 70, 71, 72, 80, 90, 100), and repeatedly flows a switching current corresponding to an input voltage of said coil (21, 51) through said coil (21, 51); and
a diode (23, 53) which rectifies the switching current flowing in accordance with energy stored in said coil (21, 51), and supplies the rectified switching current to said charging element (24, 54).

7. A power supply device comprising:
a charging section (20, 50) which is activated to charge a charging element (24, 54);
a direct-current voltage generation section (30, 60) which generates a second direct-current voltage based on a first direct-current voltage of said charging element (24, 54), and applies the generated second direct-current voltage to a load (L); and
an operation control section (40, 41, 42, 70, 71, 72, 80, 90, 100) which actuates said charging section (20, 50), determines whether a state of said load (L) to which said direct-current voltage generation section (30, 60) applies the second direct-current voltage is a lightly loaded state or not, and in a case where determining that said load (L) enters a lightly loaded state, controls said charging section (20, 50) to stop operation of charging said charging element (24, 54) when a preset time period elapses after it determines that said load (L) enters the lightly loaded state;
wherein
the preset time period is set in advance based on a startup time which is required from when said charging section (20, 50) is activated to when the first direct-current voltage reaches a voltage which appears when said charging section (20, 50) operates in a non-lightly loaded state and is set in a range of 100 μsec to 10 sec.

8. A method for controlling a power supply device comprising a charging section (20, 50) which is activated to charge a charging element (24, 54), and a direct-current voltage generation section (30, 60) which generates a second direct-current voltage based on a first direct-current voltage of said charging element (24, 54) and applies the generated second direct-current voltage to a load (L), characterized by comprising:
a step of determining whether said load (L) is in a lightly loaded state or not;
a step of starting detection of elapsed time from the timing at which said load (L) enters in a lightly loaded state; and
a step of controlling said charging section (20, 50) to stop operation. when the preset time period elapses after it is determined that said load enters a lightly loaded state.

9. The method for controlling a power supply device according to claim 8, characterized in that
the preset time period is determined based on a startup time which is required from when said charging section is activated to when the first direct-current voltage reaches a voltage which appears when said charging section operates in a non-lightly loaded state.

10. The method for controlling a power supply device according to claim 9, wherein the preset time period is set in a range of 100 μsec to 10 sec.

11. A method for controlling a power supply device having a charging section which is activated to charge a charging element, and a direct-current voltage generation section which generates a second direct-current voltage based on a first direct-current voltage of said charging element and applies the generated second direct-current voltage to a load, comprising:
a determining step of determining whether said load is in a lightly loaded state or not; and
a control step of, in a case where it is determined that said load enters a lightly loaded state, controlling said charging section to stop operation, when the preset time period elapses,
wherein
said control step comprises:
a step of starting detection of elapsed time from the timing at which said determining step determines that said load (L) enters in a lightly loaded state:
a step of outputting control signal when it is detected that the preset time period elapsed after said determining step determines that said load enters a lightly loaded state; and
a step of stopping the operation of charging said charging element when said control signal is output.

12. A power supply device comprising:
a charging section which is activated to charge a charging element;
a direct-current voltage generation section which generates a second direct-current voltage based on a first direct-current voltage of said charging element, and applies the generated second direct-current voltage to a load; and
an operation control section which actuates said charging section, determines whether a state of said load to which said direct-current voltage generation section applies the second direct-current voltage is a lightly loaded state or not, and in a case where determining that said load enters a lightly loaded state, controls said charging section to stop operation of charging said charging element when a preset time period elapses after it determines that said load enters the lightly loaded state,
wherein
said operation control section comprises:
a section which detects a loaded state of said load and outputs a determination signal when said load is in a lightly loaded state;
a section which starts detection of elapsed time when the determination signal is output and outputs a determination signal representing that the preset time period elapses when the determining signal is output; and
a section which controls, in response to the determination signal, said charging section to stop the operation of charging said charging element.

* * * * *